United States Patent
Barrie

[11] 3,909,169
[45] Sept. 30, 1975

[54] INJECTION MOULDING APPARATUS

[75] Inventor: Ian Torrance Barrie, Wheathampstead, England

[73] Assignee: Imperial Chemical Industries Limited, London, England

[22] Filed: July 10, 1973

[21] Appl. No.: 378,020

Related U.S. Application Data

[63] Continuation-in-part of Ser. No. 322,940, Jan. 12, 1973.

[30] Foreign Application Priority Data
June 27, 1973   United Kingdom............... 30513/73

[52] U.S. Cl. ................. 425/130; 425/150; 425/817
[51] Int. Cl.². ... B29F 1/10; B29F 1/12; B29D 27/04
[58] Field of Search .......... 425/130, 145, 150, 244, 425/129 S, 817 R, 4

[56]   References Cited
   UNITED STATES PATENTS

| | | | |
|---|---|---|---|
| 2,680,883 | 6/1954 | Ashbaugh | 425/244 X |
| 3,242,533 | 3/1966 | Wintriss | 425/150 X |
| 3,616,495 | 11/1971 | Lemelson | 425/155 |
| 3,709,644 | 1/1973 | Farrell | 425/244 X |
| 3,733,156 | 5/1973 | Garner | 425/129 X |
| 3,787,159 | 1/1974 | Bielfeldt | 425/150 X |
| 3,793,415 | 2/1974 | Smith | 425/817 |
| T904,007 | 11/1972 | Garner | 425/817 R |

FOREIGN PATENTS OR APPLICATIONS 1,255,970   12/1971   United Kingdom

Primary Examiner—Francis S. Husar
Assistant Examiner—Carl Rowold
Attorney, Agent, or Firm—Cushman, Darby & Cushman

[57]   ABSTRACT

Injection moulding apparatus has a mould defined by two or more opposed mould members, means for moving said mould members towards each other, two injection units and a valve to connect one unit or the other to the mould cavity. Control means are provided to switch the valve while the mould members are moving towards each other.

20 Claims, 9 Drawing Figures

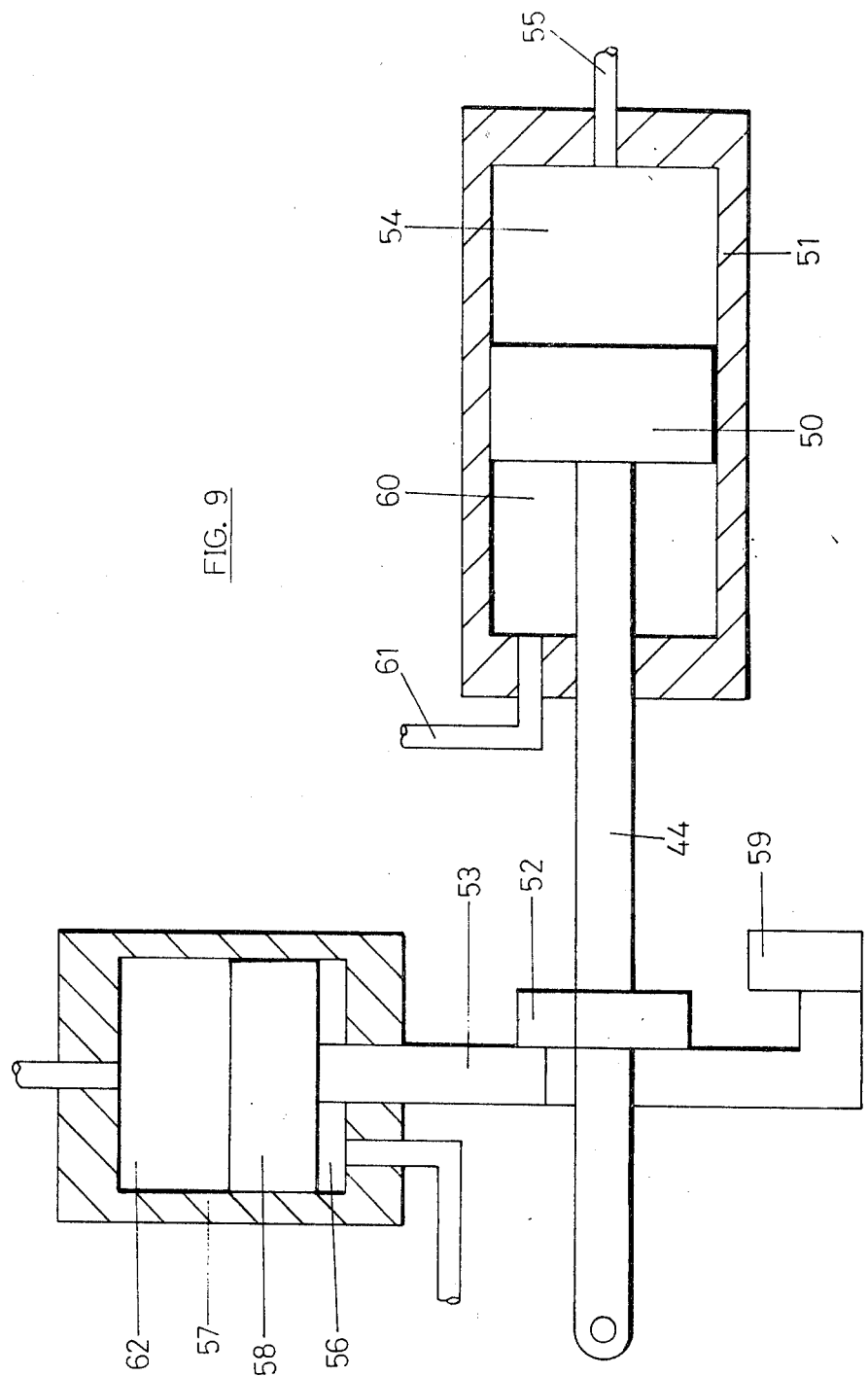

INJECTION MOULDING APPARATUS

This Application is a continuation-in-part of my U.S. Application Ser. No. 322 940 filed Jan. 12, 1973 entitled "Injection mounding process."

In this Application I described an injection moulding process for making articles having a skin of one material enclosing a core of a dissimilar material at all points away from the sprue area of the moulding. That process involved sequential injection of the skin and core material and at least while the changeover from injecting skin material to injecting core material was taking place, the opposed mould members that define the mould cavity were moved towards each other. This has the effect of subjecting the material in the mould cavity to a squeezing operation so that movement of the advancing front of the injected material is maintained during any interruption between supplies of the skin and core material. This avoids the formation of a marking termed hesitation line, on the resultant moulding which occurs if the advancing melt front is temporarily halted.

The present invention provides apparatus suitable for use in that process.

According to the present invention I therefore provide apparatus for injection moulding comprising at least two relatively moveable opposed mould members which together define a mould cavity, moving means for moving at least one of said opposed mould members relative to another of said opposed mould members from the position wherein a moulding can be removed from the mould cavity to the position wherein the mould cavity is closed, and vice versa, whereby the distance between said opposed mould members may be varied, two injection means for injecting plastics material into the mould cavity, valve means disposed between said injection means and the mould cavity which can be switched between a first position wherein only the first injection means communicates with the mould and a second position wherein only the second injection means communicates with the mould cavity, and control means for actuating the valve means to switch from said first position to said second position while said at least one opposed mould member is moving toward said other opposed mould member.

The movement of the opposed mould members is accomplished by, prior to switching the valve means from the first to the second position, having the opposed mould members spaced apart and causing them to close together under the action of the mould clamping force while said switching of the valve takes place.

Naturally, if a mould of the well known "horizontal flash" construction is used, the mould members defining the mould cavity must initially be spaced apart while skin material is being injected and must be forced together to squeeze the injected skin material outwards so that they contact each other along the parting line to close the mould cavity before skin material has reached the mould parting line.

If the so called "vertical flash" mould construction is used, i.e. wherein the mould cavity is enclosed but variable in volume by the mould members sliding with respect to one another, the squeezing of the skin material may be accomplished by relative sliding of the mould members.

The movement of the opposed mould members squeezing the skin material outwards may also be continued after switchover so as to assist filling of the mould cavity, particularly when using "vertical flash" construction moulds. Indeed the movement of the mould members towards each other, and thus squeezing of the skin material, may be continued, if desired, until after completion of injection of the core material, although this is generally not necessary.

As explained hereinafter I prefer to inject a further charge composed of skin material after injection of the core material. Generally this further charge of skin material will only amount to a very small percentage, often 1% or less, of the total weight of material injected. In such a case there is generally no need to force the mould members closer together during switchover from injecting core material to injecting the further amount of skin material. However, if the further charge of skin material amounts to more than about 5% by weight of the total material injected, for the reasons mentioned above, we prefer that the mould members are also forced closer together during the switchover from injecting core material to injecting the further charge of skin material. In this case the movement of the mould members may be continuous from before commencement of injection of core material until after completion of core material injection or there may be a period during core material injection when no movement of the opposed mould members takes place.

Using the apparatus of the present invention the distance between the opposed mould walls is initially greater than at completion of injection. This also enables, in some cases, thinning of the skin layer on the mould wall opposite to the injection orifice caused by the scouring action of the injection of the core material to be reduced.

The proportion of skin to core material that should be injected will depend on a variety of factors including temperatures and mould cavity shape but normally it is desired to use the minimum amount of skin material that is consistent with the desired properties of the article and that is sufficient to prevent the core material bursting through the skin. This latter amount can be determined by a few trial mouldings, varying the proportions of skin and core materials.

The amount and rate at which the opposed mould surfaces should be forced together will likewise depend on a variety of factors but again can be determined by a few trial mouldings.

Plastics materials that may be used for the skin and core materials are described in aforesaid U.S. Application Ser. No. 322 940.

In a preferred embodiment of the process as described in U.S. Application Ser. No. 322 940, the core material is foamable. Preferably it comprises a polymeric material and a blowing agent that evolves a gas on heating above a certain temperature, herein termed the activation temperature, e.g. by volatilisation (when the pressure on the composition is reduced) or by decomposition and is injected at a temperature above the activation temperature of the blowing agent.

If such a core material is injected at the customary injection rates and pressures used in injection moulding, subsequentially no foaming will occur until the desired amount of core material has been injected. When using a foamable core material, two alternative modes of operation may be utilised. In the first, the amount of skin material and foamable, but as yet unfoamed, core material injected is insufficient to fill the mould cavity and the core material is allowed to foam, at the same time extending the enveloping skin material to the extremities of the mould cavity. In the second mode of operation, the amount of skin material and foamable, but as yet unfoamed, core material injected in such that the cavity is filled before substantial foaming takes place, and the mould cavity is then enlarged to permit foaming to occur.

It is preferred to use the second of these alternatives as this provides a more regular cell structure in the core of the moulded article and also produces an articles with superior surface finish.

In this preferred embodiment for the production of foamed mouldings as set out above, the enlargement of the mould cavity may be effected in one of two ways. One or more of the mould members defining the mould cavity may be retracted by some external force which may instantaneously enlarge the cavity to the desired extent or may gradually enlarge the cavity. Alternatively, when using a "vertical flash" mould configuration, the clamping pressure holding the mould members together may be reduced so that the pressure of the gases generated by the decomposition or volatilisation of the blowing agent will enlarge the mould cavity; here again the clamping pressure may be reduced gradually allowing a gradual expansion of the mould cavity or reduced instantaneously allowing a sudden expansion.

Conveniently the mould cavity may be enlarged by moving apart the opposed mould members forced towards each other during switchover from injecting skin to injecting core material.

Thus the mould members are moved towards each other, at least while switchover is taking place, and, in this preferred embodiment, after the mould cavity has been filled, they are moved apart to permit foaming.

The size and shape of the final mould cavity depends on the article being produced but moulds of maximum final cavity thickness less than 25 mm, preferably between 2 mm and 10 mm thick, are particularly useful.

The apparatus of the present invention has separated injection means for the skin and core materials. The injection of the materials and the movement of the opposed mould members is synchronised to achieve the required moulding cycle. Similarly if the apparatus is used to produce foamed core mouldings and the mould cavity is to be enlarged to allow the charge of foamable material to foam, this enlargement of the mould must be included in the programming of the machine.

As mentioned hereinbefore the process of application 322 940 produces articles having a skin of a plastics material surrounding and contacting a core of dissimilar plastics material except, possibly, at the sprue area of the article.

Generally injection moulded articles are removed from the mould cavity with the material solidified in the sprue channels attached thereto. These sprues are generally not part of the desired article and so are removed from the moulding after the latter is taken from the mould cavity. The area of the article from which the sprue was detached is termed the sprue area.

When the core material is injected into the mould cavity through a sprue channel to penetrate to within the interior of the skin material a small amount of core material will occur at the surface of the sprue area of the article if the sprue is detached therefrom.

The amount of the core material exposed at the sprue area can be reduced by injecting a further, small, quantity of skin material through the same sprue channel through which the core material was injected, after injection of the core material, so that, when the sprue is removed from the moulding, only a narrow annulus of core material is left exposed. This narrow annulus results from core material not swept out of the sprue channel by the injection of this small further charge of skin material as it adheres to the walls of the sprue channel. However, by using high injection rates and heated sprue channels so that very little core material is left as an adhering layer on the sprue channel walls, the narrow annulus of core material exposed at the sprue area of the article can be made so narrow that is is virtually indistinguishable. Generally, as mentioned hereinbefore, the further charge of skin material will amount to less than 1% by weight of the total injected.

In the apparatus of the present invention a valve is disposed between the two injection units, which are preferably reciprocating screw injection units. The valve is preferably of the type described in British Pat. No. 1 219 097 and has three positions: a position wherein neither injection unit is connected to, i.e. communicates with, the mould cavity, a position wherein only one injection unit is connected to the mould cavity, and a position wherein only the other injection unit is connected to the mould cavity. As the valve switches from the position wherein only one injection unit is connected to the mould cavity to the position wherein only the other injection unit is connected to the mould cavity, it may go through either an intermediate position wherein neither unit is connected to the mould cavity or a position wherein both units are connected to the mould cavity.

Where it is desired to inject a further amount of skin material after injection of core material, a valve having the aforesaid three distinct positions (as opposed to intermediate positions) is conveniently operated through the following sequence: 1. neither unit is connected to mould 2. move to skin unit connected to mould 3. move to core unit connected to mould 4. move back to position 2 5. move back to position 1.

The controlled rate of movement of the opposed mould members may be achieved by arranging that one of the opposed mould members is forced towards the other hydraulically and the rate of supply of hydraulic fluid effecting such movement is controlled.

In a preferred form of the apparatus one of the opposed mould members engages with one or more hydraulic rams or pads mounted on the other opposed mould member and said one mould member is forced against said rams. Hydraulic fluid is released from said rams at a controlled rate to effect the controlled movement. The rate may conveniently be varied from one moulding cycle to another if desired by providing an adjustable valve for effecting this release of hydraulic fluid. Initiation of the release of fluid may be triggered by means of a switch actuated when the mould members reach a predetermined, adjustable, position relative to one another as they are brought together from the mould open position whereat the moulding from the previous moulding cycle is removed from the mould.

The initiation of injection of skin material by switching the valve to connect the skin material injection unit to the mould cavity, is also preferably triggered by switches actuated when the opposed mould members reach predetermined, adjustable, positions relative to one another.

Initiation of injection of core material, by switching the valve to connect the core material injection unit to the mould cavity, is preferably triggered by means of a switch actuated when the skin material injection unit has injected a predetermined quantity of skin material. Such a switch may be operated when the injection ram of the skin material injection unit reaches a predetermined position. Preferably the position of the switch is adjustable relative to the ram position.

Injection of the further amount of skin material, if this is required, and switching the valve to the position wherein neither injection unit is connected to the mould may similarly be triggered e.g. by switches actuated when the injection rams reach predetermined positions.

Preferably the length of the cooling cycle is set by an adjustable timer. Starting of the timer is preferably triggered by the switching of the valve to the position wherein neither injection unit is connected to the mould cavity.

Where enlargement of the mould cavity to allow a foamable core material to foam is desired, this may be triggered by the time and stopped by a switch actuated when the mould members have moved apart the desired amount.

The timer may also trigger recharging of the injection units and movement apart of the opposed mould members at the end of the cooling cycle to allow the moulding to be removed from the mould cavity.

The invention is further illustrated by reference to the accompanying drawings wherein FIGS. 1 to 7 are cross sections of a mould cavity showing various stages in the moulding cycle.

FIGS. 8 and 9 illustrate one embodiment of the apparatus of the invention that may be used to produce foam cored mouldings.

FIG. 8 is a diagrammatic layout of the apparatus and associated hydraulic and electrical circuits. In this figure, hydraulic lines are shown by double continuous lines while electrical connections are shown by a single dotted line.

FIG. 9 is a diagrammatic layout of part of the tap control mechanism.

Figure 1:
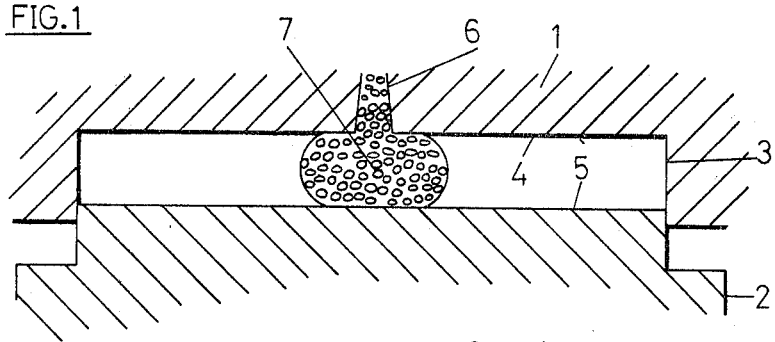
Figure 2:
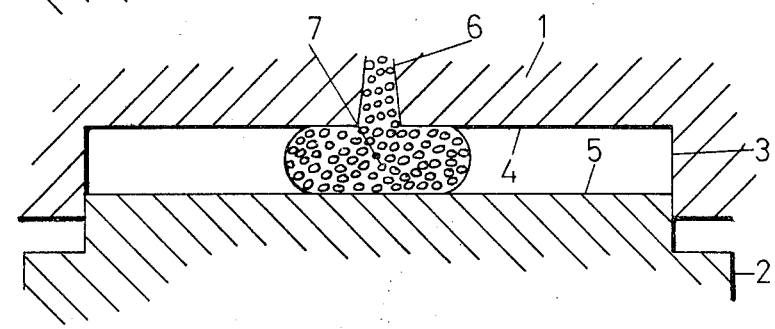
Figure 3:
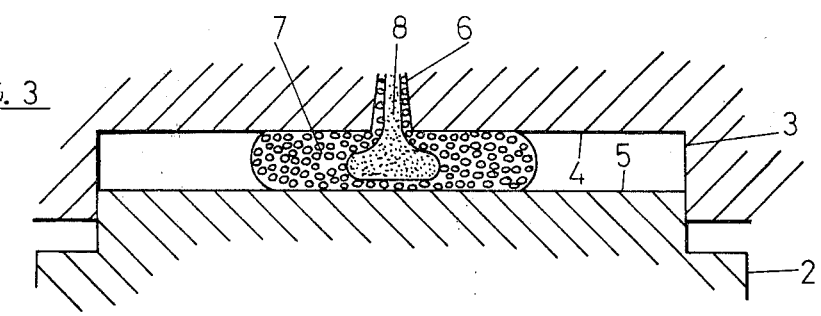
Figure 4:
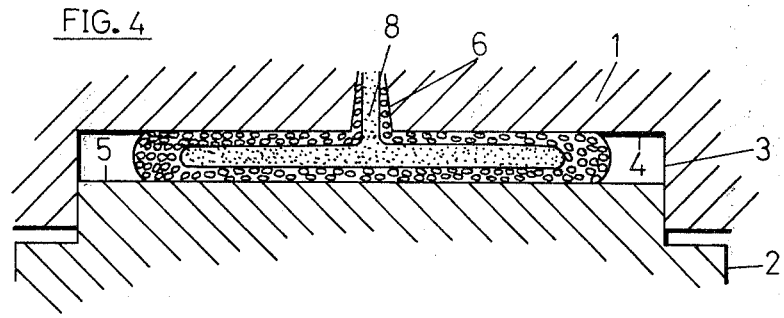
Figure 5:
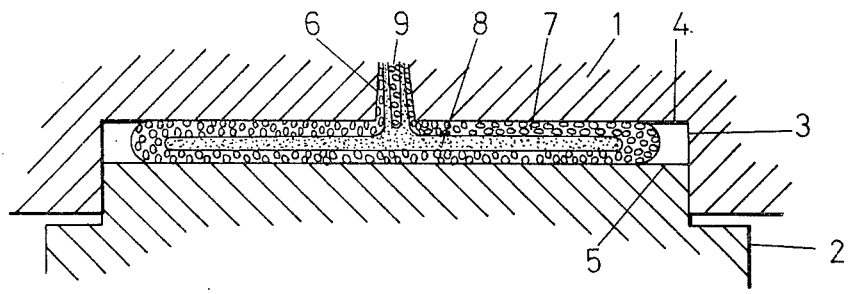
Figure 6:
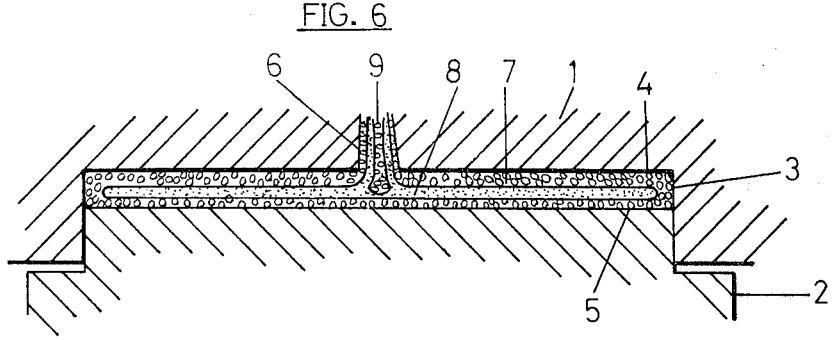
Figure 7:
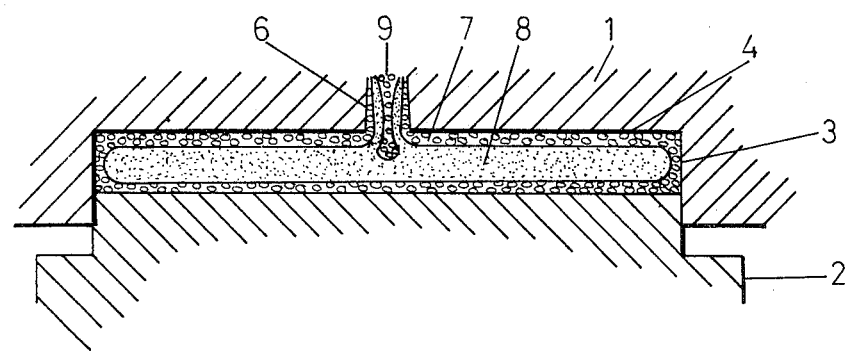

Referring to FIGS. 1 to 7, the mould is a vertical flash mould comprising a pair of mould members 1, 2 which are slidably moveable with respect to one another along the wall 3 of the mould cavity. The mould cavity is defined by opposed surfaces 4 and 5 of the mould members 1, 2 respectively and wall 3 of mould member 1. A sprue channel 6 is formed in mould member 1 and communicates with the mould cavity at an area in surface 4. An injection moulding machine having two injection barrels (not shown) communicates with the sprue channel 6 via a valve (not shown) of the type described in British Pat. No. 1 219 097 whereby the injection barrels can alternately be brought into communication with sprue channel 6 or both barrels can be isolated from the sprue channel 6. The mould member 2 can be urged towards mould member 1 by a conventional hydraulic clamping ram (not shown).

Initially the mould members are spaced apart and skin material 7, is injected into the mould cavity through sprue channel 6. The skin material contacts the opposed surface 5 of the mould cavity and spreads outwards towards wall 3 (see FIG. 1). The clamp ram pressure is then increased so that mould member 2 moves towards mould member 1 thus squeezing the skin material 7 between the mould surfaces 4 and 5 (see FIG 2). While the mould surfaces 4 and 5 are moving towards each other the valve is switched to stop the injection of skin material 7 and commence injection of core material 8, which is injected to within the skin material 7 (see FIG. 3). Injection of the core material 8 and forcing together of the mould members 1 and 2 is continued (see FIG. 4) and when the desired amount of core material has been injected, the valve is switched to inject a further amount 9, of skin material through sprue channel 6 (see FIG. 5), continuing the forcing together of the mould members, 1 and 2. After completion of injection of the further amount 9 of skin material the mould members are forced together so that the material injected into the cavity is squeezed to fill the mould cavity (see FIG. 6). The clamp pressure is then relaxed, thereby permitting the mould members 1 and 2 to be forced apart as the core material 8 foams. As mentioned hereinbefore, where the further amount 9 of skin material is small, the forcing together of the mould members 1, 2 may be stopped after commencement of core material injection.

Figure 8:
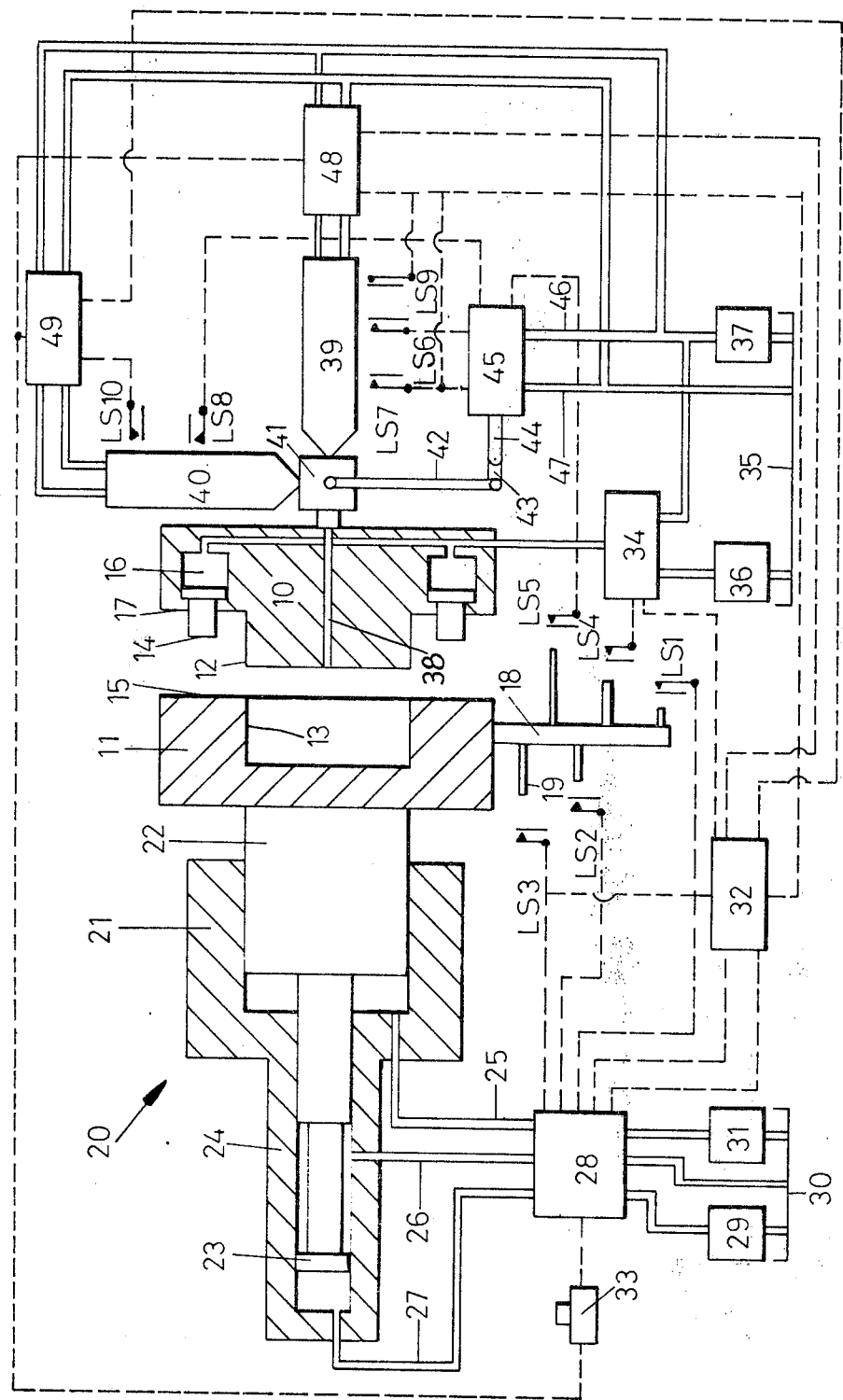

Referring to FIG. 8, the mould is defined by a fixed mould member 10 and a moving member 11. These mould members are shown in FIG. 8 in the 'mould' position, before the commencement of a moulding cycle, whereat the moulding from the previous mould cycle can be removed from the mould cavity.

The two mould members 10, 11 can slidably engage along the side walls 12, 13 of the mould members to define a variable volume mould cavity. Provided round the periphery of mould member 10 are a plurality of hydraulic pads 14 the ends of which engage with the face 15 of mould member 11 as the mould is closed. By allowing hydraulic fluid to be released, as hereinafter described, from the chambers 16 behind pads 14, pads 14 can retract until face 15 of mould member 11 abuts against face 17 of mould member 10.

Mould member 17 carries an arm 18 on which are mounted a number of adjustable stops 19 for engagement with limit switches LS 1, 2, 3, 4 and 5.

Mould member 11 can be moved towards, or away from, mould member 10 by means of a clamp unit generally designated 20. The clamp unit consists of a cylinder 21 in which a piston 22 attached to mould member 11 is mounted. Piston 22 also carries an auxiliary piston 23 mounted in a cylinder 24 attached to cylinder 21. Hydraulic fluid can be supplied to, or released from, the cylinders 21 and 24 via hydraulic lines 25, 26, 27. Control of the clamp unit is effected, as is further described hereinafter, by means of a control unit 28 which is supplied with hydraulic fluid under pressure from a pump 29 from a reservoir 30. As is normal practice a relief valve (not shown) is provided to recycle hydraulic fluid to reservoir 30 from pump 29 when the pump reaches its maximum pressure rating.

Clamp unit control unit 28 is actuated electrically by means of signals from limit switches LS 1, LS 2 and LS 3 actuated by the mold moving member 11, by means of signals from a timer 32 and by a start button 33.

The control of hydraulic fluid release, as hereinafter described, from chambers 16 in mould member 10, is effected by means of a control unit 34 which can release fluid to reservoir 35 via an adjustable release valve 36. Control unit 34 can be supplied with hydraulic fluid from a pump 37 (also fitted with a relief valve — not shown — as previously described in relation to pump 29) from reservoir 35 when it is desired to repressurise chambers 16. Control unit 34 is actuated by limit switch LS 4 actuated by mould member 11 and by a signal from timer 32.

Plastics material can be injected into the mould cavity through a sprue channel 38 in mould member 10, from reciprocating screw ram plastics material injection units 39, 40 via a valve 41. Suitably the valve 41 is of the type described in our U.K. Pat. Specification No. 1 219 097 and is operated by a lever 42 attached, via a link 43, to a rod 44 in a valve control unit 45.

This valve control unit 45, which is described in more detail hereinafter in relation to FIG. 9, is actuated by signals from limit switch LS 5 actuated by moving mould member 11, by signals from limit switches LS 6 and 7, actuated by movement of the ram of injection unit 39 and limit switch LS 8 actuated by movement of the ram of injection unit 40. The signal from limit switch LS 7 is also used to start the timer 32.

Valve control unit 45 is supplied with hydraulic fluid from pump 37 via hydraulic line 46 and can release hydraulic fluid to reservoir 35 via hydraulic line 47.

The injection units 39 and 40 are driven, for the reciprocating motion, by hydraulic fluid from pump 37 via control units 48, 49 which can also permit release of hydraulic fluid from the injection units to reservoir 35.

Control units 48, 49 can be acutated by signals from the start button 33 and by limit switches LS 9, 10 actuated by the rams of injection units 39 and 40 respectively.

Recharging of the injection units 39, 40 is effected in the normal manner of rotating the screws by means of motors (not shown) while allowing hydraulic fluid to be released from the injection ram cylinders through control units 48 and 49 to the reservoir 35. The release of the hydraulic fluid is controlled to maintain a predetermined pressure on the injection rams during the screw back operation. Commencment of screw back is initiated by signals from the timer 32 which causes the screw motors to commence rotating and the control units 48 and 49 to allow controlled release of hydraulic fluid to the reservoir 35. Screw back is stopped by the actuation of limit switches LS and LS 10 when the injection rams have screwed back the desired amount. These limit switches LS 9 and 10 stop rotation of the screw motors in addition to actuating control units 48, 49 to stop release of hydraulic fluid from injection units 39, 40 to reservoir 35.

Part of the valve control unit 45 is shown in more detail in FIG. 9. It is here seen that it comprises a double acting piston 50 (which actuates rod 44) mounted in a cylinder 51. A collar 52 is mounted on rod 44 and this may engage with a stop 53 which prevents further movement of piston 50 when chamber 54 of cylinder 51 is pressurized with hydraulic fluid through hydraulic line 55. Stop 53 can be retracted by applying hydraulic fluid to chamber 56 of cylinder 57 in which piston 58 attached to stop 53 is mounted.

When chamber 54 of cylinder 51 is pressurised and stop 53 retracted, piston 50 can move further away from hydraulic line 55. Retraction of stop 53 causes a second stop, 59 attached to stop 53, but offset therefrom, to move towards rod 44. When chamber 60 of cylinder 51 is pressurised through hydraulic line 61 (and hydraulic fluid is allowed to flow from chamber 54 back to the reservoir through hydraulic line 55) the piston 50 is forced towards hydraulic line 55 until collar 52 engages with stop 59. Movement of piston 58 towards rod 44, by pressurising chamber 62 of cylinder 57 and releasing hydraulic fluid from chamber 56, moves stop 59 out of engagement with collar 52 and so piston 50 can move further towards hydraulic line 55. The piston 50, and hence valve 41, thus has three positions:

a. piston 50 at the hydraulic line 55 end of cylinder 51: in this position valve 41 isolates both injection units 39 and 40 from sprue 38.

b. piston 50 in mid position with collar 52 abutting against stop 53 or stop 59: in this position the valve 41 connects only injection unit 39 to sprue 38.

c. piston 50 at the hydraulic line 61 end of cylinder 51: in this position the valve 41 connects only injection unit 40 to sprue 38.

It will be appreciated that the hydraulic valve arrangements in control units 28, 34, 45, 48 and 49 do not form part of the present invention and suitable arrangements can readily be devised to cause the control units to function in the manner described hereinafter. Further it will be appreciated that pressure control valves may be incorporated in the hydraulic lines as necessary.

The operation of the system is as follows. Initially the system is as shown in FIG. 8 with the mould open, injection units 39 and 40 recharged after screwback, chambers 16 in mould member 10 pressurised, and valve 41 in the position (a) specified above, i.e. wherein both injection units 39 and 40 are isolated from sprue 38.

Start button 33 is then actuated. This causes control units 48, 49 to connect injection units 39, 40 to the hydraulic fluid supply from pump 37 and hence the injection units are pressurised ready for commencement of injection. Actuation of start button 33 also causes control unit 28 to supply oil from pump 29 to hydraulic line 27 to cause the piston 23, and hence piston 22 and mould member 11, to move towards mould member 10. At this stage control unit 28 also allows hydraulic oil to be released from hydraulic line 27 to reservoir 30 and to flood, generally by a gravity feed, from reservoir 30, into the space in cylinder 21 vacated by the movement of piston 22.

The mould members thus move towards each other. One of the stops 19 then operates limit switch LS 1 which actuates control unit 28 to cut off the flooding of hydraulic fluid into cylinder 21 and to pump hydraulic fluid into cylinder 21 via hydraulic line 25. This has the effect of slowing down the rate of movement of the mould members towards each other. Mould walls 12 and 13 then slidably engage and face 15 of mould member 11 contacts hydraulic pads 14. When face 15 contacts pads 14, limit switch LS 4 is operated and this actuates control unit 34 to release hydraulic fluid, via adjustable release valve 36, from chambers 16 to the reservoir 35. By controlling the rate of release of hydraulic fluid from chambers 16, the rate of movement of mould member 11 towards mould member 10 can be controlled.

While mould member 11 is still moving towards mould member 10, limit switch LS 5 is operated. This actuates control unit 45 to supply hydraulic fluid to chamber 54 of cylinder 51 and hence force piston 50 to the mid position whereupon it is arrested by collar 52 engaging with stop 53. Thus valve 41 is moved to the position (b) wherein injection unit 39 is connected to sprue 38. Since injection unit 39 is connected to the hydraulic fluid supply and hence pressurised upon actuation of start button 33, plastics material is injected through sprue 38 into the mould cavity as soon as valve 41 is moved to this position (b).

When the desired amount of plastics, which constitutes the skin material, has been injected from injection unit 39, the ram of injection unit 39 operates limit switch LS 6. This pressurises chamber 56 of cylinder 57 and causes stop 53 to move out of engagement with collar 52. Piston 50 can then move to the (c) position specified above so that the valve 41 is moved to the position wherein only injection unit 40 is connected to sprue 38. Foamable plastics material, which constitutes the core material, is thus injected from injection unit 40.

The rate of release of hydraulic fluid from chambers 16 in mould member 10 is arranged such that face 15 of mould member 11 does not abut against face 17 of mould member 10 until after valve 41 has switched to position (c) and injection of core material has commenced.

When the desired amount of material has been injected from injection unit 40, the ram of injection unit 40 operates limit switch LS 8. This actuates control unit 45 to release hydraulic fluid from chamber 24 of cylinder 51 and to supply hydraulic fluid to chamber 60 to force piston 50 back to the mid position until collar 52 abuts against stop 59.

The valve 41 is thus moved to position (b) again and a further amount of material is injected into the mould cavity from injection unit 39. When the desired amount of this further material from injection unit 39 has been injected, the ram of injection unit 39 operates limit switch LS 7. This actuates control unit 45 to release hydraulic fluid from chamber 56 of cylinder 57 and to supply hydraulic fluid to chamber 62 of cylinder 57. Stop 59 is thus moved out of engagement with collar 52 and so piston 50 is forced, by the hydraulic fluid supplied to chamber 60 of cylinder 51 to the position (a). Thus valve 41 is moved to the position wherein both injection units are isolated from the sprue channel 38.

Operation of limit switch LS 7 by the ram of injection 39 also starts the timer 32 operating.

After a predetermined time, a signal from timer 32 actuates clamp control unit 28 to release hydraulic fluid, via adjustable release valve 31 from hydraulic lines 25 and 27 and to supply hydraulic fluid to hydraulic line 26. This causes the piston 23, and hence piston 22 and mould member 11, to move away from mould member 10 thus enlarging the mould cavity to allow the foamable core of the moulding to foam. When the mould members have moved apart by the desired amount, another of the stops 19 operates limit switch LS 2 which actuates control unit 28 to stop the supply of hydraulic fluid to hydraulic line 26 and the release of hydraulic fluid to hydraulic lines 25 and 27.

After the predetermined cooling cycle, timer 32 actuates control unit 28 again to reconnect hydraulic fluid to hydraulic line 26 and to allow release of hydraulic fluid from hydraulic lines 25 and 27. In this instance the hydraulic fluid in cylinder 21 is allowed to flood back into reservoir 30. The pressurisation of hydraulic line 26 thus causes the mould members to move apart to the mould open position to allow the moulding to be removed. When the mould members have moved apart to the desired extent, limit switch LS 3 is operated. This resets the timer 32 to zero and stops the supply of hydraulic fluid to hydraulic line 26.

During the cooling cycle, the timer 32 also starts the injection unit screw motors and actuates control units 48 and 49, to allow screw back to occur.

Also, after actuation of control unit 28 to move the mould members 10 and 11 apart after the desired cooling cycle, timer 32 actuates control unit 34 to repressurise chambers 16.

It will be appreciated that where it is not desired to have a distinct further injection of skin material after injection of core material, stop 59 and limit switch LS 7 can be omitted and the operation of the timer 32 commenced by means of limit switch LS 8. Also if it is not desired to enlarge the mould cavity after injection of the core material, one of the outputs from the timer 32 to control unit 28 and limit switch LS 2 can be omitted.

In an alternative embodiment, the hydraulic pads 14, chambers 16, control unit 34, release valve 36 and limit switch LS 4 can be omitted; reliance being placed on the slower final closing of the mould by means of the pressurised hydraulic fluid supply to cylinder 21 to obtain the desired rate of movement of the mould members 10, 11 together during injection of the skin material and commencement of core material injection.

EXAMPLE 1

Using the procedure outlined above in relation to the drawings, a panel in the shape of a rectangle (1070 × 610 mm) was made using a vertical flash mould. The mould cavity was defined by two mould members maintained at 60°C by circulating water.

Initially the mould was in the 'open' position i.e. that position which enabled the moulding from the previous moulding cycle to be removed from the cavity. The mould members were then moved towards each other to close the mould, initially at a fast rate but, over the last 50 mm of their travel at a rate of 1 cm sec$^{-1}$. Injection of polypropylene skin material was commenced when the surfaces of the mould members defining opposed surfaces of the mould cavity were about 30 mm apart.

1360 ml of skin material was injected at a temperature of 250°C and at a rate of approximately 800 ml sec$^{-1}$. When the skin material had been injected, which took an injection time of about 1.7 secs, the valve was switched and then 2550 ml of a foamable polypropylene core composition comprising 0.4% by weight of azodicarbonamide as blowing agent was injected at a temperature of 200°C and at a rate of 1200 g sec$^{-1}$. Throughout the injection of the skin material, and until part of the core material had been injected, the mould members were being moved towards each other at the rate of 1 cm sec$^{-1}$. Movement of the mould members was stopped when the cavity thickness had fallen to 6 mm. After injection of the core material, the valve was switched back to the supply of skin material and a further 25 ml of polypropylene was injected at 250°C and at a rate of approximately 800 ml sec$^{-1}$. The period of interruption of material flow during the operation of the valve was about 0.1 sec for each switching operation.

After injection of the further amount of skin material, the valve was switched to the shut-off position and then the clamping pressure was reduced and the mould members moved apart to a cavity thickness of 10 mm to allow the core composition to foam. When the moulding had completely solidified, it was removed from the mould. The resultant panel had a foamed core enclosed in an unfoamed skin and had excellent mould definition and surface finish and exhibited no hesitation mark.

EXAMPLE 2

By way of comparison, Example 1 was repeated but the mould members were moved together until the cavity thickness was 6 mm before commencement of injection of the skin material. The mould members were not moved towards each other during the injection of skin or core materials or during switchover. After filling the mould the cavity thickness was enlarged, by allowing the mould members to move apart relative to one another, to 10 cm to permit foaming of the core.

The resultant panel exhibited a prominent hesitation mark and marked thinning of the skin opposite the sprue channel.

I claim:

1. Apparatus for injection moulding comprising a mould containing a mould cavity defined by at least two mould members including a first mould member and a second mould member, opposed to, and moveable relative to, said first mould member, moving means for moving said second mould member relative to said first mould member from the position wherein a moulding can be removed from the mould cavity to the position wherein the mould cavity is closed, and vice versa, whereby the distance between said first and second mould members may be varied, two injection means for injecting plastics material into the mould cavity, valve means disposed between said injection means and the mould cavity which can be switched between a first position wherein only the first injection means communicates with the mould and a second position wherein only the second injection means communicates with the mould cavity, mould control means for controlling the movement of said second mould member toward said first mould member, and valve control means for actuating the valve means to switch from said first position to said second position while said second mould member is moving towards said first mould member.

2. Apparatus as claimed in claim 1 wherein one of the first and second mould member is provided with at least one hydraulic ram with which the other of the first and second mould members is engageable under pressure, and means are provided to release hydraulic fluid from said at least one ram at a controlled rate.

3. Apparatus as claimed in claim 2 wherein triggering means are provided to initiate release of said hydraulic fluid, said fluid release triggering means being actuatable when said second mould member has moved to the position relative to said first mould member wherein the mould member, engageable with said at least one ram, engages with said at least one ram.

4. Apparatus as claimed in claim 1 wherein the valve means has a shut off position wherein neither injection means communicates with the mould cavity.

5. Apparatus as claimed in claim 4 wherein triggering means are provided to cause the valve means to switch from said shut off position to said first position, said valve triggering means being actuatable when said second mould member has moved to a predetermined position relative to said first mould member from the position wherein a moulding can be removed from the mould cavity.

6. Apparatus as claimed in claim 1 wherein triggering means, actuatable when a predetermined amount of material has been injected from the first injection means, are provided to cause the valve to switch from the first position to said second position.

7. Apparatus as claimed in claim 1 wherein triggering means, actuatable when a predetermined amount of material has been injected from the second injection means, are provided to cause the valve to switch from the second position to the first position.

8. Apparatus as claimed in claim 4 wherein triggering means, actuatable when the predetermined total amount of material has been injected from the first and second injection means, are provided to cause the valve to switch to the shut off position.

9. Apparatus as claimed in claim 8 wherein the triggering means actuatable to cause the valve to switch to the shut off position is also arranged to start a timer.

10. Apparatus as claimed in claim 9 wherein the timer is actuatable, after a predetermined length of time, to cause said second mould member to commence movement away from said first mould member.

11. Apparatus as claimed in claim 10 wherein triggering means, actuatable when said second mould member has moved away from said first mould member by a predetermined amount, are provided to stop movement of said second mould member.

12. Apparatus for injection moulding comprising:
i. a mould containing a mould cavity defined by at least two mould members including a first mould member and a second mould member opposed to, and moveable relative to, said first mould member;
ii. moving means for moving said second mould member relative to said first mould member from the position wherein a moulding can be removed from the mould cavity to the position wherein the mould cavity is fully closed, and vice versa, whereby the distance between said first and second mould members may be varied, one of said first and second mould members being provided with
iii. at least on hydraulic ram positioned such that, at a predetermined position in the travel of the second mould member moveable relative to said first mould from the position wherein a moulding can be removed from the mould cavity towards the position wherein the mould cavity is fully closed, the other of said first and second mould members engages with said at least one hydraulic ram, and, after such engagement, the movement of said second member relative to said first mould member under the action of said moving means can be controlled by control of release of hydraulic fluid from said at least one hydraulic ram;
iv. release means to permit controlled release of hydraulic fluid from said at least one hyraulic ram;
v. first triggering means to trigger said release means, said first triggering means being actuated by said second mould member when it has moved to the position relative to said first mould member wherein the mould member, engageable with said at least one ram, engages with said at least one ram;

vi. two injection means for injecting plastics material into the mould cavity;
vii. valve means disposed between said injection means and the mould cavity, which valve means can be switched through a sequence of valve positions, which sequence includes switching from a first position wherein only the first injection unit communicates with the mould cavity to a second position wherein only the second injection unit communicates with the mould cavity;
viii. control means for switching said valve means through said sequence of positions; and
ix. second triggering means to trigger the control means to initiate the switching of the valve means through its sequence of positions, said second triggering means being actuated by said second mould member when it has moved to a predetermined position relative to said first mould member.

13. Apparatus as claimed in claim 12 wherein said second triggering means is positioned such that it is actuated by said second mould member when second mould member is in a position which is after that where said opposed mould member, engageable with said at least one ram, engages with said at least one hydraulic ram, and after that position where the firt triggering means is actuated but which is before the first and second mould members reach the fully closed position.

14. Apparatus as claimed in claim 12 wherein the valve means has a shut-off position wherein neither injection means communicates with the mould cavity.

15. Apparatus as claimed in claim 14 wherein the injection means comprise rams reciprocatably mounted in barrels and the second triggering means triggers the control means to switch the valve from the shut-off position to the first position and third triggering means are provided, said third triggering means being actuated when the ram of the first injection reaches a predetermined position and which triggers the control means to switch the valve from said first position to said second position.

16. Apparatus as claimed in claim 15 wherein fourth triggering means, actuatable when the ram of the second injection means reaches a predetermined position, is provided to trigger the control means to switch the valve from said second position to said first position.

17. Apparatus as claimed in claim 14 wherein triggering means, actuatable when the predetermined total amount of material has been injected from the first and second injection means, are provided to cause the valve to switch to the shut-off position.

18. Apparatus as claimed in claim 17 wherein the triggering means actuatable to cause the valve to switch to the shut-off position is also arranged to start a timer.

19. Apparatus as claimed in claim 18 wherein the timer is actuatable, after a predetermined length of time, to cause said second mould member to commence movement away from said first mould member.

20. Apparatus as claimed in claim 19 wherein triggering means, actuatable when said second mould member has moved away from said first mould member by a predetermined amount, are provided to stop movement of the second mould member.

* * * * *

UNITED STATES PATENT OFFICE
CERTIFICATE OF CORRECTION

PATENT NO. : 3,909,169
DATED : September 30, 1975
INVENTOR(S) : IAN TORRANCE BARRIE It is certified that error appears in the above-identified patent and that said Letters Patent are hereby corrected as shown below:

Please add the following to the front page format under "FOREIGN APPLICATION PRIORITY DATA":

--January 20, 1972    United Kingdom        2814/72--

In column 4, lines 40 - 43, after "sequence", the lines should be set out as follows:

--1) neither unit is connected to mould
  2) move to skin unit connected to mould
  3) move to core unit connected to mould
  4) move back to position 2
  5) move back to position 1.-- instead of running lines together as they are in the printed patent.

In column 4, line 43, the bold type for numerals "2" and "1" should be changed to a soft type as they are liable to cause confusion with reference numerals "1" and "2" in the drawings - see column 5, line 48.

In column 6, line 28, after "'mould", second occurrence, the word --open'-- should be inserted so that it will read "'mould open'".

In column 7, line 31, "acutated" should be --actuated--.

Signed and Sealed this twentieth Day of January 1976

[SEAL]

Attest:

RUTH C. MASON
*Attesting Officer*

C. MARSHALL DANN
*Commissioner of Patents and Trademarks*